(12) United States Patent
Wang et al.

(10) Patent No.: US 8,537,936 B2
(45) Date of Patent: Sep. 17, 2013

(54) CHANNEL QUALITY ESTIMATION FROM RAW BIT ERROR RATE

(75) Inventors: Yi-Pin Eric Wang, Fremont, CA (US); George Jöngren, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 383 days.

(21) Appl. No.: 12/779,172

(22) Filed: May 13, 2010

(65) Prior Publication Data

US 2011/0280296 A1 Nov. 17, 2011

(51) Int. Cl.
*H04L 27/06* (2006.01)
(52) U.S. Cl.
USPC .......... 375/340; 375/260; 375/267; 375/299; 375/347; 375/348; 375/349
(58) Field of Classification Search
USPC ................ 375/340, 260, 267, 299, 347, 348, 375/349
See application file for complete search history.

(56) References Cited

U.S. PATENT DOCUMENTS

| 7,688,798 | B2 | 3/2010 | Döttling et al. |
| 2002/0122397 | A1* | 9/2002 | Ling et al. ............. 370/335 |
| 2005/0007948 | A1* | 1/2005 | Wan et al. .............. 370/208 |
| 2009/0046771 | A1 | 2/2009 | Abe et al. |
| 2009/0262858 | A1* | 10/2009 | Wengerter et al. ........... 375/267 |

FOREIGN PATENT DOCUMENTS

EP 1 489 770 A2 12/2004

* cited by examiner

*Primary Examiner* — Kabir A Timory

(57) ABSTRACT

Channel quality metrics (such as SINR, BLER, and the like) are derived from a raw bit error rate (RBER), defined as the error rate of raw bits output by a demodulator. These initial raw bits are decoded and error-checked (or error-corrected). The error-free decoded bits are re-encoded, and the regenerated raw bits are compared to the initial raw bits to determine the RBER. The RBER is then converted to SINR, BLER, or other channel quality metric. The RBER-based metrics are derived from a data channel rather than reference signals, and hence more accurately reflect deviations from nominal transmission power level, and include receiver demodulator impairments.

4 Claims, 6 Drawing Sheets

CHANNEL QUALITY ESTIMATION FROM RAW BIT ERROR RATE

TECHNICAL FIELD

The present invention relates generally to wireless communication network receivers, and in particular to a method and apparatus of estimating channel quality by calculating a raw bit error rate.

BACKGROUND

Wireless communication systems provide voice and data communications between one or more fixed transceivers, known as base stations or Node Bs, and a plurality of mobile transceivers, or User Equipment (UE), across an air interface. The voice or data information (herein collectively referred to as data) are encoded, modulated onto a radio frequency (RF) carrier. The modulated RF signal is amplified, transmitted across the air interface, received, demodulated, and the demodulated bits are decoded and further processed to recover the data. The physical channel, which includes circuits in the transmitter, the air interface, and circuits in the receiver, introduces impairments (interference and noise), making the received signal differ, often significantly, from the transmitted signal. The inverse of the extent to which the channel impairs the transmitted signal is referred to as channel quality. A common metric of channel quality is the Signal to Interference and Noise Ratio (SINR); another is the block error rate (BLER).

One method of improving spectral efficiency for a given channel quality is link adaptation, also known as adaptive coding and modulation (ACM). In one form of link adaptation, a transmission format (TF), which specifies the modulation type, forward error correction (FEC) coding rate, number of transmit antennas to employ (i.e., space-time code), number of spatial multiplexing streams, and other parameters, is adaptively selected from a fixed number of possibilities, in response to dynamic measurements of the channel quality. To enable assessment of the channel quality, known data patterns, referred to as reference signals or pilots, are transmitted across the air interface. By comparing received reference signals to their known value, a receiver can assess and quantify the impairment characteristics, and report the channel quality.

Several types of reference signals are used for channel characterization. For example, in LTE uplink, two types of reference signals are employed. A sounding reference signal (SRS) is used to facilitate frequency dependent scheduling. A demodulation reference signal (DMRS) facilitates coherent demodulation. Particularly in a rapidly changing channel, sending more reference signals increases channel characterization accuracy and hence improves link adaptation. However, reference signals decrease spectral efficiency, as they consume air interface bandwidth yet do not transmit user data. Additionally, in practice, impairments arising from imperfections in the transmitter and receiver circuits are difficult to accurately estimate using reference signals.

SUMMARY

According to one or more embodiments described and claimed herein, channel quality metrics (such as SINR, BLER, and the like) are derived from a raw bit error rate (RBER), defined as the error rate of raw bits output by a demodulator. These initial raw bits are decoded and error-checked (or error-corrected). The error-free decoded bits are re-encoded, and the regenerated raw bits are compared to the initial raw bits to determine the RBER. The RBER is then converted to SINR, BLER, or other channel quality metric.

One embodiment relates to a method of estimating channel quality in receiver operative in a wireless communication network. A wireless signal is received from a transmitter. The received signal is demodulated to generate initial raw bits. The initial raw bits are decoded to generate decoded bits. An error check is performed on the decoded bits. Regenerated raw bits are generated by encoding the decoded bits that pass the error check. The initial raw bits are compared to the regenerated raw bits to determine a RBER. The RBER is used to generate a channel quality metric.

Another embodiment relates to a receiver operative in a wireless communication network. The receiver includes a demodulator operative to demodulate a received wireless communication signal to generate initial raw bits; a decoder operative to decode the initial raw bits to generate decoded bits; an error checker operative to detect or correct errors in the decoded bits; an encoder operative to encode error-free decoded bits to generate regenerated raw bits; a comparator operative to compare the initial raw bits to the regenerated raw bits and determine a RBER; and a converter operative to convert the RBER to a channel quality metric.

DETAILED DESCRIPTION

The present invention relates to channel estimation, using the Raw Bit Error Rate (RBER), in a wireless communication network. To provide a complete and enabling disclosure, embodiments of the present invention are described herein in the context of the Long Term Evolution (LTE, or LTE Advanced) of the Universal Mobile Telecommunications System (UMTS). However, it should be noted that the present invention is not limited to LTE, or any other particular wireless communication protocol.

Figure 6:
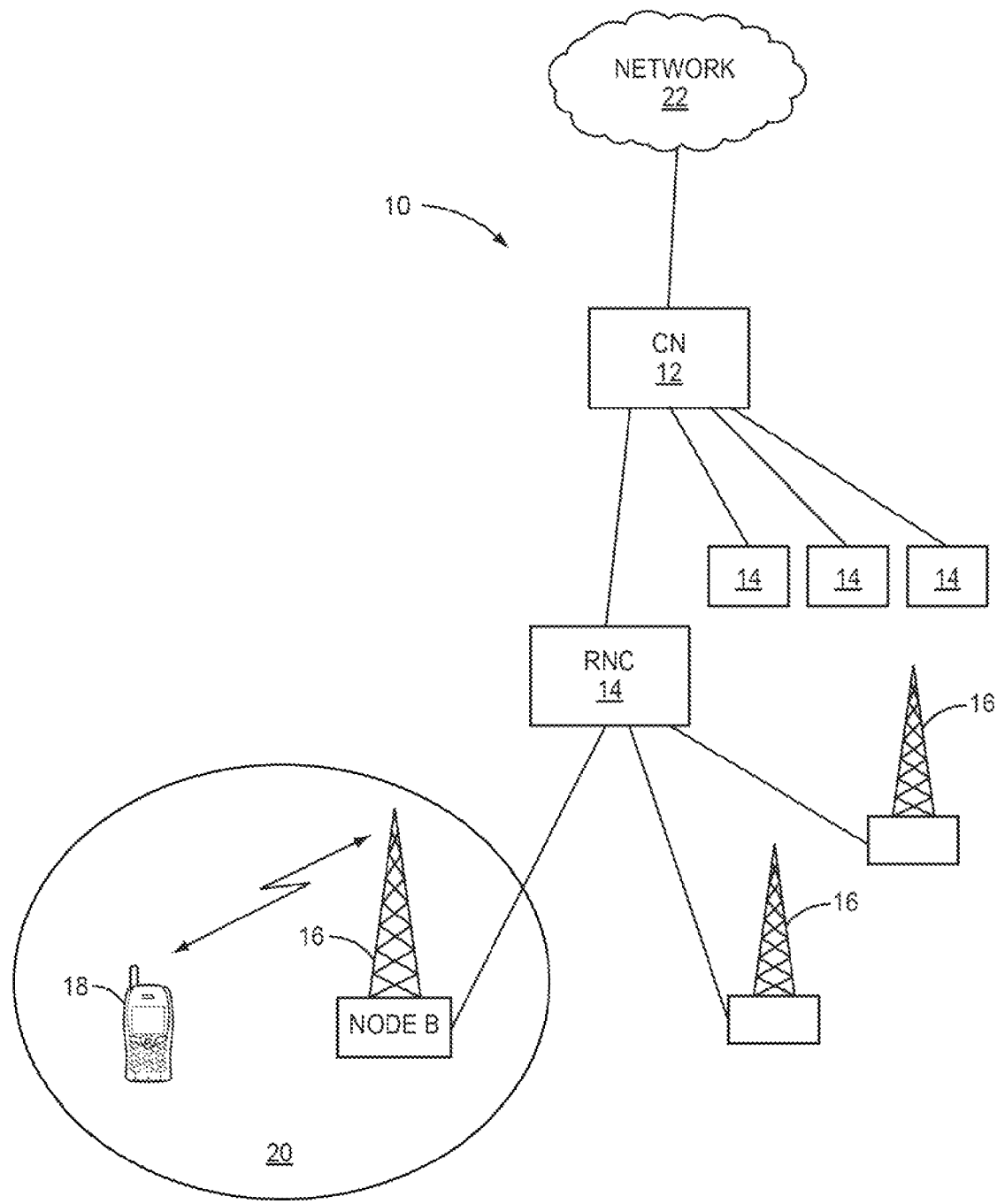
FIG. 6 is a functional block diagram of a prior art wireless communication network.

FIG. 6 depicts a representative LTE network 10. The network 10 comprises a core network 12 interconnecting and controlling a plurality of Node Bs, or base stations, 16. Each Node B 16 includes radio transceivers to effect wireless communications with a plurality of User Equipment (UE), or mobile terminals, 18 within a geographic region, or cell, 20. The network 10 provides voice and data communications between UEs 18 in the network 10, and also between UEs 18 and one or more external networks 22, such as the Public Switched Telephone Network (PSTN), the Internet, another wireless network, or the like.

As discussed above, characterization of the physical channel between the Node B 16 is traditionally performed using known reference signals, which consume valuable air interface resources (transmit power, bandwidth, and the like), and themselves generate interference in communication signals to other UEs 18. According to embodiments of the present invention, channel quality (e.g., SINR) is estimated from the Raw Bit Error Rate (RBER) of a received communication signal, such as the physical uplink shared channel (PUSCH). Not only does this approach reduce the need for reference signal overhead, it captures all impairments in the channel, including loss incurred during the modulation. The RBER may be mapped to a SINR, block error rate (BLER), or other channel quality metric.

Figure 1:
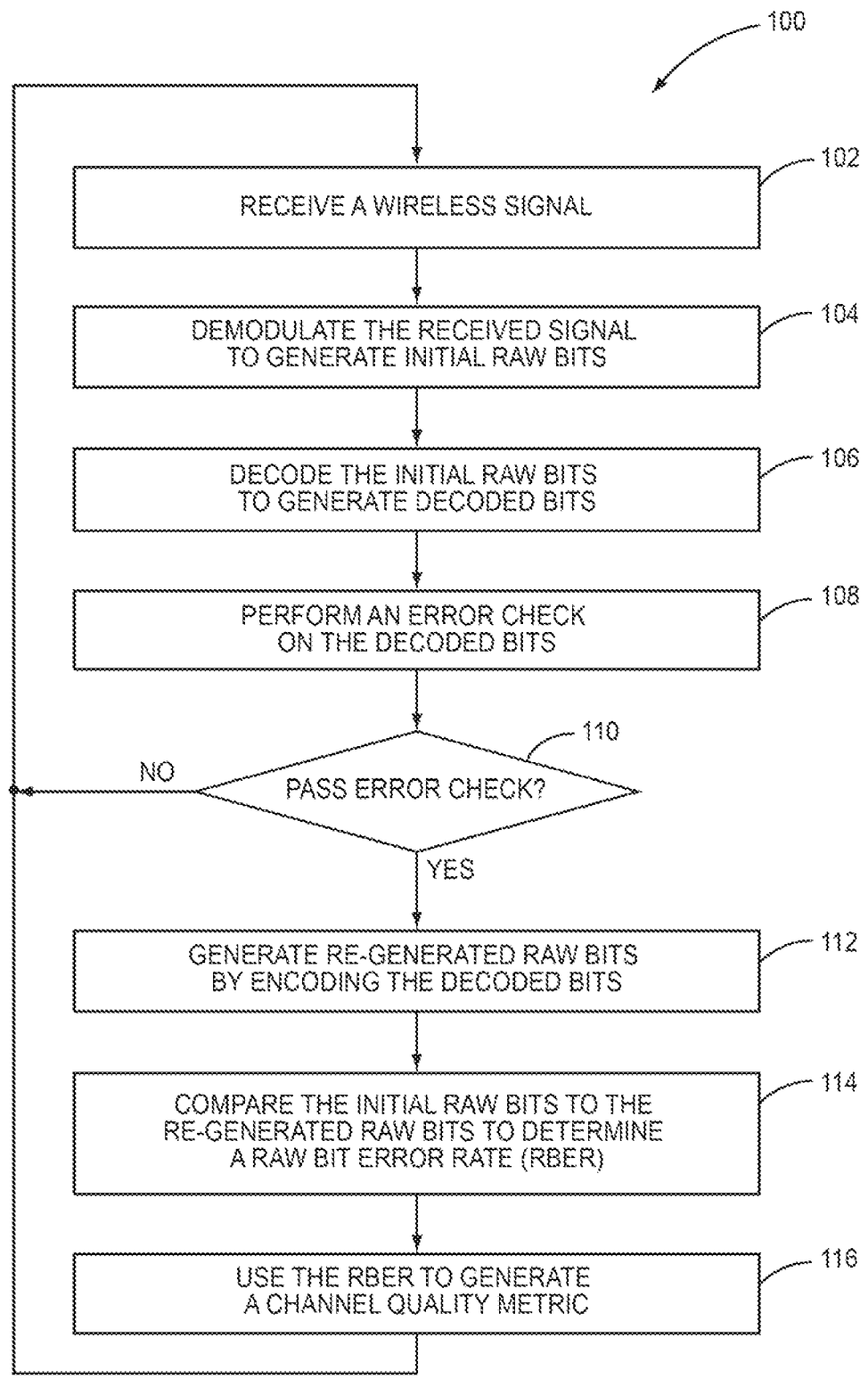
FIG. 1 is a flow diagram of a method of estimating channel quality in wireless communication network receiver.
Figure 2:
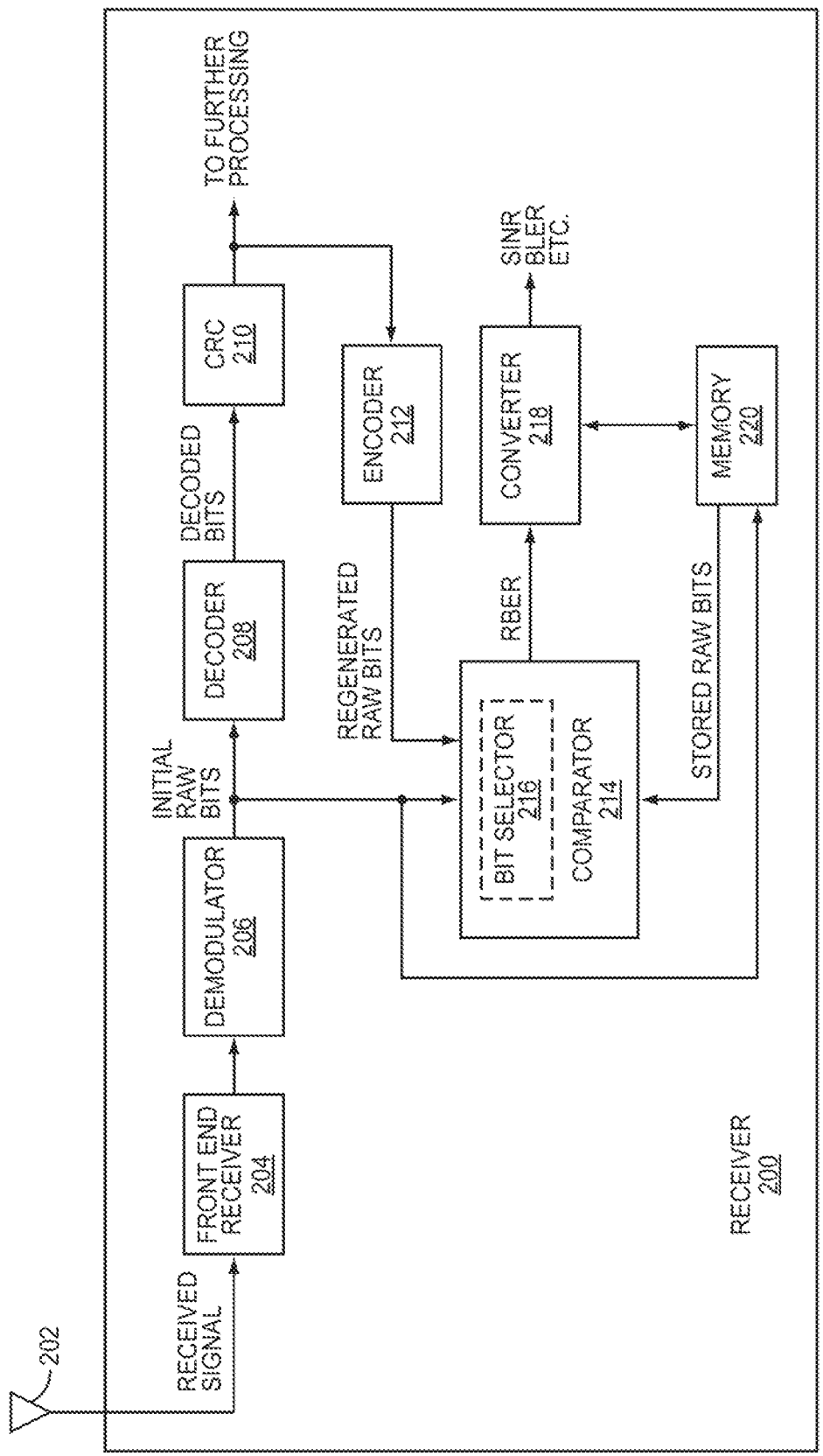
FIG. 2 is a functional block diagram of a wireless communication network receiver implementing the method of FIG. 1.

FIG. 1 depicts a method 100 of estimating channel quality in a wireless communication network receiver 200, depicted in FIG. 2. The receiver 200, which may comprise the receiver side of a transceiver, and which may reside in a Node B 16 or UE 18, receives a wireless signal (block 102) at one or more antennas 202. The received signal is processed by a front end receiver circuit 204, including low-noise amplification, filtering, frequency downconversion to baseband, analog to digital conversion, in-phase (I) and quadrature-phase (Q) separation, and the like. The front end processed signal is demodulated by a demodulator 206, generating initial raw bits (block 104). The initial raw bits are decoded by a decoder 208, generating decoded bits (block 106). The decoded bits are error-checked (block 108), and if possible error-corrected, such as by operation of the cyclic redundancy check (CRC) 210. If the decoded bits pass the error check (block 110) (either by being error-free or being corrected), they are passed on for further processing, as known in the art.

To determine the RBER, the initial raw bits generated by the demodulator 206 are compared to their transmitted values. These are obtained by encoding the decoded bits that pass the error check in the encoder 212, generating regenerated raw bits (block 112). The initial raw bits and the regenerated raw bits are compared in the comparator 214, which determines the RBER (block 114). In some embodiments, a bit selector 216 selects only a subset of the raw bits (both initial and regenerated) per symbol for comparison, as discussed in greater detail herein. In one embodiment, the comparator 214 ensures that the RBER is based on a statistically significant sample by only generating a RBER if the number of initial raw bits in error exceeds a predetermined threshold.

Figure 3:
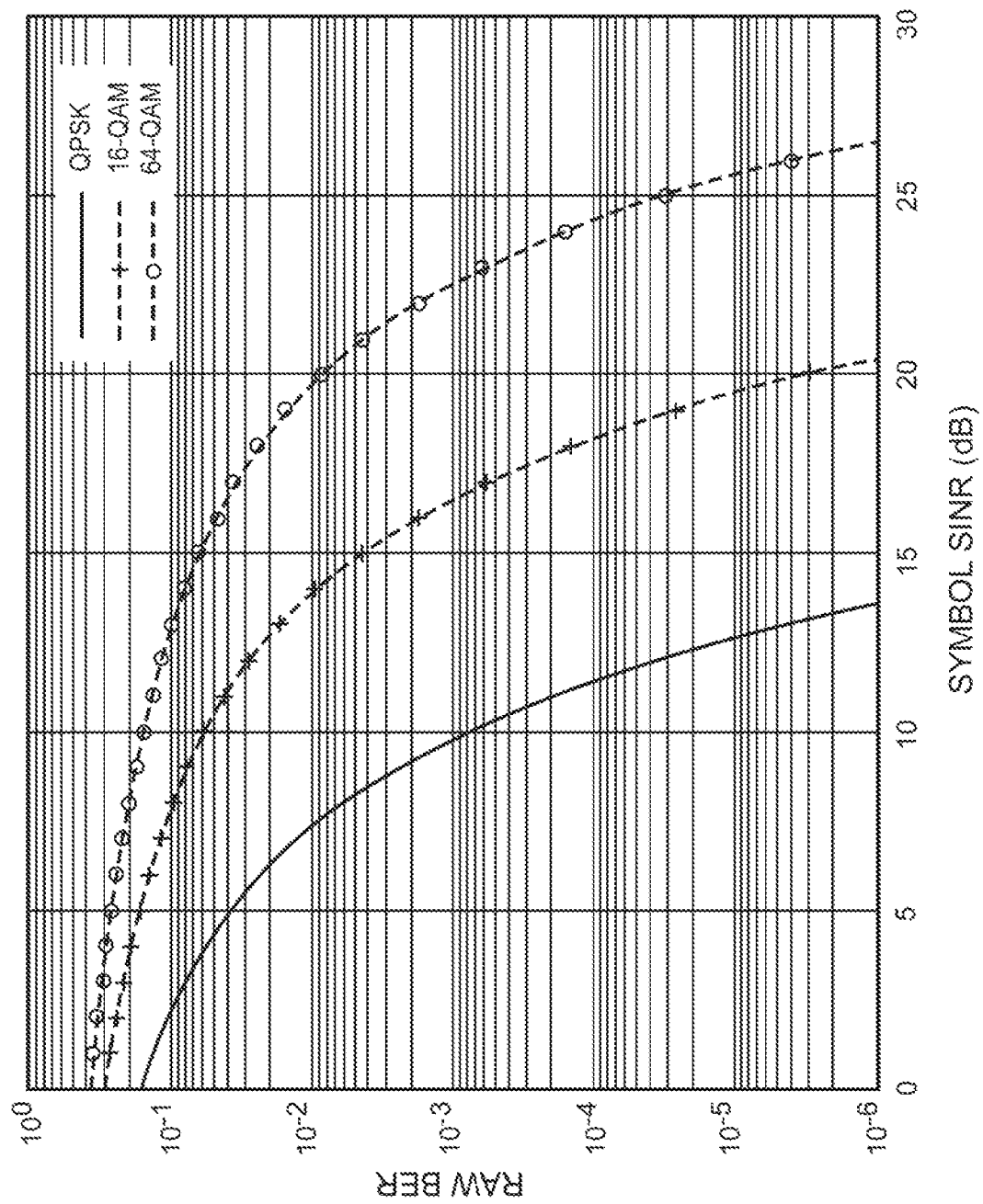
FIG. 3 is a graph depicting the relationship between raw bit error rate and SINR for three different modulation techniques.

A converter 218 converts the RBER to a useful metric of channel quality, such as SINR, BLER, or the like. The converter 218 preferably compiles (or is provisioned with) and maintains a separate mapping table between the RBER and the desired channel quality metric for each modulation format. For example, FIG. 3 depicts the relationship between RBER and SINR for quadrature phase shift keying (QPSK); 16-element quadrature amplitude modulation (16-QAM), and 64-QAM. In operation, interpolation may be used for RBER values between table entries. The converter 218 is operatively connected to memory 220 to store the channel quality metric conversion look-up tables.

The memory 220 may also store initial raw bits. If the decoded bits fail a CRC check, the receiver may request a retransmission (e.g., according to a HARQ protocol). In this case, the initial raw bits may be stored to memory 220. When the receiver 208 later receives the retransmitted signal, and it passes the CRC check, the comparator 214 compares the regenerated raw bits to the initial raw bits for the retransmitted signal. In one embodiment, the comparator 214 may additionally retrieve the stored raw bits from the first received signal, and compare them to the regenerated raw bits from the retransmitted signal. In this manner, the channel quality for both subframes (that of the original signal and that of the retransmitted signal) may be estimated.

The memory 220 may also store prior RBER values. In one embodiment, the converter 218 may average the RBER over two or more subframes (or other predefined transmission duration, depending on the wireless communication protocol). Of course, the converter 218 may also store, and average, other metrics derived from the RBER, such as SINR, BLER, or the like.

In one embodiment, the communication signal received at the antenna 202 is a conventional data signal received over a data channel, e.g., PUSCH. In one embodiment, to improve the accuracy of channel estimation using the RBER, the transmitter sends a high-order modulated and heavily encoded signal. Such a signal is conceptually an information-bearing sounding reference signal, as it facilitates channel characterization while also carrying useful data. The signal may be modulated using 16-QAM or 64-QAM modulation, which will generate a large number of erroneous initial raw bits, particularly in poor channel conditions. The signal is heavily encoded—for example, by using repetition codes to reduce the coding rate to below rate 1/3—so that the data may be recovered reliably in the face of the high RBER.

Figure 4:
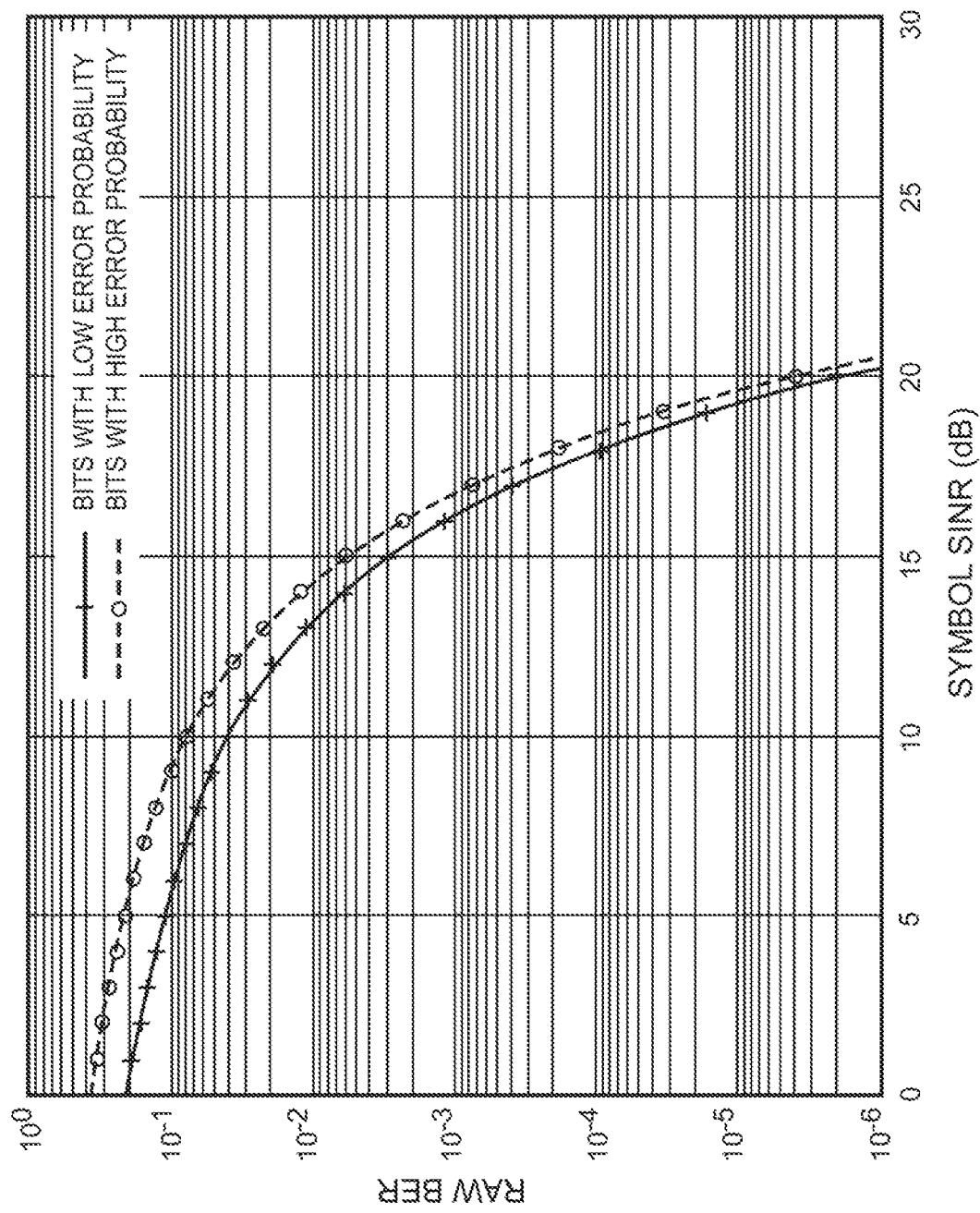
FIG. 4 is a graph depicting the relationship between raw bit error rate and SINR for high and low probability bit subsets for 16-QAM modulation.
Figure 5:
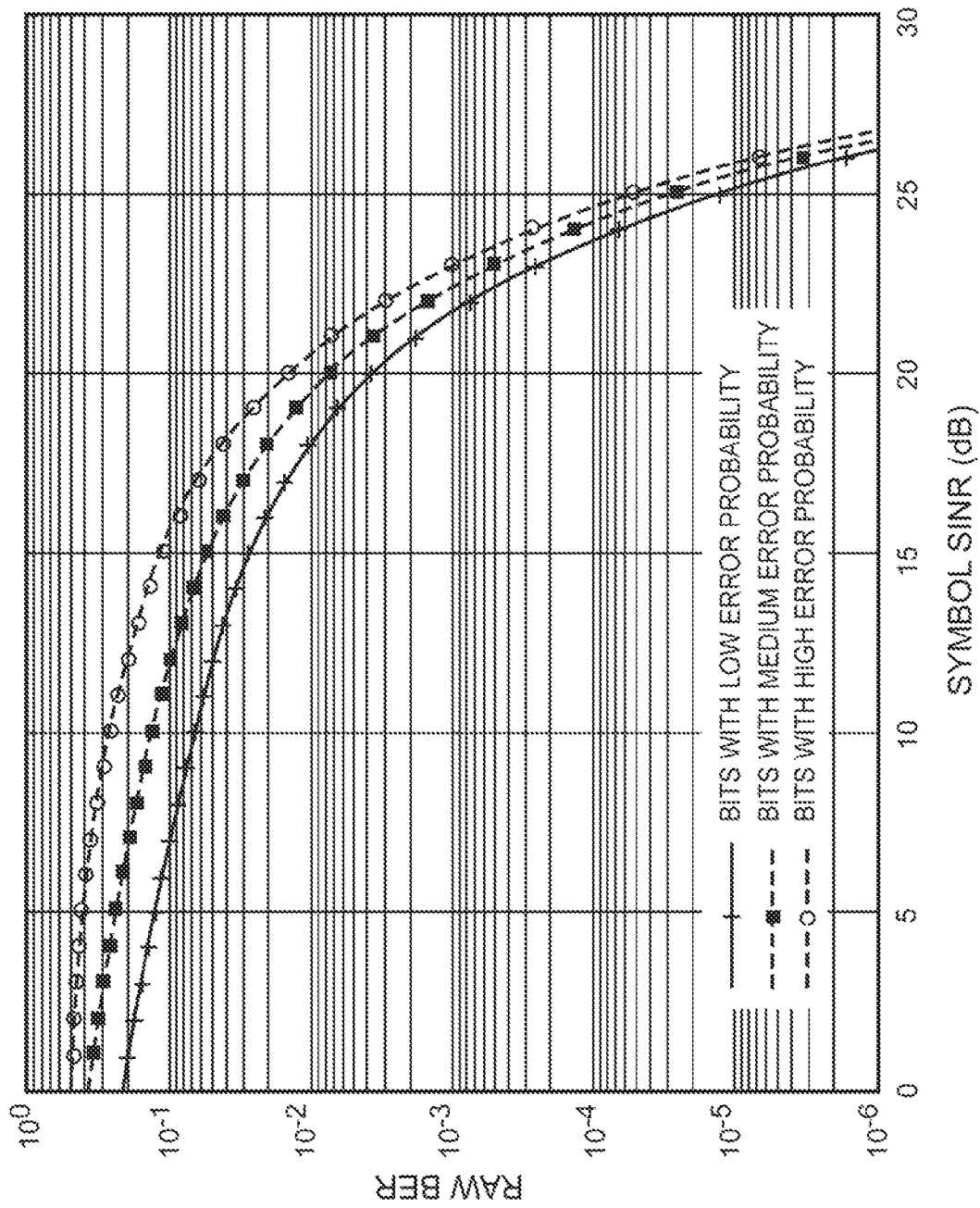
FIG. 5 is a graph depicting the relationship between raw bit error rate and SINR for high, medium, and low probability bit subsets for 64-QAM modulation.

In one embodiment, the comparator 214 includes a bit selector 216. The bit selector 216 increases the reliability of RBER estimation by selecting, from the initial raw bits and regenerated raw bits, a subset of bits per symbol having a higher probability of error, prior to comparison of the subsets by the comparator 214. Consider rectangular 16-QAM modulation. In this modulation scheme, four bits are mapped to each symbol. A first subset of the four bits identifies the sign of a symbol (+ or − for each of I and Q axes), and a second subset of the four bits identifies the magnitude of the symbol (1 or 3). Statistically, the sign bits are demodulated with greater accuracy (as they identify the quadrant of the IQ constellation diagram) than the magnitude bits (which identify the position of the symbol within a quadrant). This is depicted in FIG. 4. Similarly, as depicted in FIG. 5, in rectangular 64-QAM modulation, two of the six bits in each symbol have a low error probability, two have a medium error probability, and two have a high error probability. By considering only the subset of bits per symbol for each type of modulation that have the highest error probability, the comparator 214 generates a more reliable estimate of RBER, as it is derived from a more statistically robust sample.

The estimation of RBER, and hence RBER-derived SINR or BLER, is most accurate at low to intermediate relative speed between the transmitter and receiver (i.e., UE 18 speed). Accordingly, in one embodiment, the RBER method of channel quality estimation may be selectively engaged, and in particular may be terminated at high UE 18 speed (that is, UE 18 speed, relative to the Node B 16, above a predetermined threshold). UE 18 speed may be determined in the UE 18 by a positioning system, such as GPS, and reported to the Node B 16. Alternatively, UE 18 speed may be determined by the UE 18 or the Node B 16 my measuring Doppler frequency shift, or by other means, as known in the art.

In one embodiment, the RBER corrects a bias or offset in conventional SINR estimation obtained from reference signals. For example, a bias may occur due to circuit impairments in the transmitter and/or receiver. In this embodiment, a receiver estimates a conventional SINR from reference signals, as known in the art. The receiver also generates an RBER-based SINR estimate, as described herein. An SINR bias term is the difference between the conventional SINR and the RBER-based SINR estimates. The SINR bias term may be computed for each of a plurality of predetermined transmission durations, such as frames or subframes, and averaged over several such durations to improve estimation accuracy.

Due to non-linearity in the transmitter power amplifier, the actual transmit power of a wireless communication network transmitter often deviates from the nominal transmitter power. In one embodiment, a RBER-based SINR estimate is used to generate and maintain a correction term for each nominal transmit power level.

LTE uplink imposes loose restrictions on the tolerance between the transmission towers of different transmission. Accordingly, an SRS transmission by a UE 18, used to predict the SINR in a subsequent subframe, might use a transmission power (nominal transmit power) widely different from the transmission power actually used to transmit data in the subsequent subframe. Since the Node B 16 does not have accurate information about the transmission power of the UE 18, it is difficult to compensate the conventional SINR to reflect the difference in transmission power. In this case, an RBER-based SINR estimate (or BLER estimate), obtained from the data channel (PUSCH) is more accurate than a conventional SINR estimate obtained from reference signals. For example, the SINR estimated from SRS transmitted at power level $p_1$ is $\gamma_1$. The UE 18 is allowed to transmit PUSCH at power level $p_2$. Nominally, one would expect the SINR for PUSCH to be $$\frac{\gamma_1 p_2}{p_1}.$$

However, due to PA nonlinearity, the actual PUSCH transmit power from UE 18 is $$\frac{p_2}{\Delta}.$$

According to embodiments of the present invention, the power deviation $\Delta$ can be estimated from RBER-based SINR estimation. Thus, the Node B 16 can already adjust the SINR estimation for PUSCH as $$\frac{\gamma_1 p_2}{p_1 \Delta}.$$

Embodiments of the present invention provide more accurate channel quality metrics than conventional reference signal-based approaches, as the RBER estimate includes receiver circuit impairments, including the demodulator 206. Furthermore, embodiments of the present invention improve spectral efficiency, as the channel quality is estimated from a data channel, reducing the required number of reference signal transmissions. The accurate channel quality estimation includes the accuracy of link adaptation, which in turn maximizes spectral efficiency for a given channel quality.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of estimating channel quality in receiver operative in a wireless communication network, comprising:
    receiving a wireless signal from a transmitter;
    demodulating the received signal to generate initial raw bits;
    decoding the initial raw bits to generate decoded bits;
    performing an error check on the decoded bits;
    generating regenerated raw bits by encoding the decoded bits that pass the error check;
    comparing the initial raw bits to the regenerated raw bits to determine a raw bit error rate (RBER); and
    using the RBER to generate a channel quality metric, wherein:
    the received signal was modulated such that each modulated symbol comprises a plurality of bits, wherein at least one subset of the bits per symbol has a higher error probability than another subset of bits; and
    comparing the initial raw bits to the regenerated raw bits to determine a RBER comprises comparing only the high error probability subset of initial raw bits per symbol to the regenerated raw bits which correspond thereto.

2. A method of estimating channel quality in receiver operative in a wireless communication network, comprising:
    receiving a wireless signal from a transmitter;
    demodulating the received signal to generate initial raw bits;
    decoding the initial raw bits to generate decoded bits;
    performing an error check on the decoded bits;
    generating regenerated raw bits by encoding the decoded bits that pass the error check;
    comparing the initial raw bits to the regenerated raw bits to determine a raw bit error rate (RBER);
    using the RBER to generate a channel quality metric by converting the RBER to a RBER-based signal to interference and noise ratio (SINR) by
    receiving known reference signals;
    estimating a conventional SINR using the known reference signals;
    comparing the conventional SINR and the RBER-based SINR to generate an SINR bias term; and
    subtracting the SINR bias term from the conventional SINR.

3. The method of claim 2 further comprising averaging the SINR bias term over a plurality of transmission durations, prior to subtracting the SINR bias term from the conventional SINR.

4. The method of claim 2 further comprising:
    receiving from the transmitter an indication of a nominal power level at which the received signal was transmitted;
    generating and storing an SINR bias term for a plurality of nominal transmitter power levels; and
    wherein subtracting the SINR bias term from the conventional SINR comprises subtracting the SINR bias term associated with a nominal transmitter power level of the received signal.

* * * * *